United States Patent

[11] 3,534,727

[72] Inventor James A. Roman
 Palmdale, California
[21] Appl. No. 626,376
[22] Filed March 24, 1967
[45] Patented Oct. 20, 1970
[73] Assignee the United States of America as represented
 by the Administrator of the National
 Aeronautics and Space Administration

[54] BIOMEDICAL ELECTRODE ARRANGEMENT
 16 Claims, 8 Drawing Figs.
[52] U.S. Cl. .................................................
[51] Int. Cl. ................................................... A61b 5/04
[50] Field of Search ......................................... 128/2.06,
 (pickup electrode digest), 404, 416, 418

[56] References Cited
 UNITED STATES PATENTS
2,943,627 7/1960 Howell .......................... 128/416

3,409,007 11/1968 Fuller ............................ 128/2.06
1,889,272 11/1932 Zerne ............................ 128/416
 FOREIGN PATENTS
1,237,702 6/1960 France ......................... 2.06/

Primary Examiner—William E. Kamm
Attorneys—G. T McCoy, J. H. Warden and Howard B. Scheckman ABSTRACT: An elastic garment, tailored to tightly fit a selected part of a body, supports a plurality of electrodes of the type used in vectorcardiography. The electrodes are flexible, each including an elastic layer of conductive cloth which is applied against a selected portion of the body when the garment is worn. The conductive layer of each electrode is electrically connected by a separate conductive wire to an output connector of the type connectable to a mating connector of a recording device. The electrodes are held in electrical contact with the body by the skintight garment, even when the wearer is physically active.

INVENTOR.
JAMES A. ROMAN

Patented Oct. 20, 1970

INVENTOR.
JAMES A. ROMAN
BY
ATTORNEYS

Patented Oct. 20, 1970

INVENTOR.
JAMES A. ROMAN
BY
Howard B. Scheckman
ATTORNEYS

INVENTOR.
JAMES A. ROMAN

BIOMEDICAL ELECTRODE ARRANGEMENT

ORIGIN OF THE INVENTION

The invention described herein was made by an employee of the United States Government and may be manufactured and used by or for the Government for Governmental purposes without the payment of any royalties thereon or therefor.

BACKGROUND OF THE INVENTION

1. Field of the Invention

This invention generally relates to electromedical devices utilizing biomedical electrodes and, more particularly, to an arrangement for applying to a body electrodes of the type used in vectorcardiology.

2. Description of the Prior Art

Although the use of vectorcardiogram data in medical diagnosis and research has greatly increased in recent years, the method of obtaining the desired data did not change. Basically, such data is obtained by positioning electrodes on selected portions of the skin of a patient who must lie still in order not to adversely affect the electrical conductivity between the body and the electrodes or not to produce undesired noise signals.

The primary disadvantage of such a method is the fact that the patient is physically inactive while the data is being obtained. Consequently, this method cannot be used to obtain data while a patient is mobile and particularly while performing strenuous exercises which are prescribed for medical diagnosis purposes.

Another disadvantage of applying electrodes to a patient's body by the prior art method is the relatively low signal-to-noise ratio of the vectorcardiogram data which is obtained by such a method, requiring its interpretation by experienced personnel. Also, since presently employed electrodes are quite small and their contact with the patient's body is critically dependent on the accurate positioning on and contact with the patient's body, only trained and experienced laboratory technicians are generally employed to gather the necessary vectorcardiogram data.

OBJECTS AND SUMMARY OF THE INVENTION

Accordingly, it is an object of the present invention to provide an arrangement for obtaining vectorcardiogram data which is not limited by the disadvantages of the prior art.

Another object of this invention is to provide a novel arrangement for applying electrodes to a patient's body so that data may be gathered while the patient is physically active.

A further object of the invention is the provision of a device which is user-oriented whereby electrodes can be accurately secured in proper electrical contact with a patient's body by a technician with a minimum of training and experience.

Still a further object of this invention is to provide an arrangement whereby electrodes are conveniently secured to be in electrical conductivity with selected portions of a patient's body, providing signals with a high signal-to-noise ratio which can be automatically processed to provide meaningful medical information.

These and other objects of the invention are achieved by providing an elastic garment, tailored to tightly fit a selected naked portion of a human torso, for example. The garment is made of a material which is electrically nonconductive and which generally does not cause skin irritation when in contact with the skin for long periods. Specially designed electrodes, which include an electrically conductive cloth, are fastened to the inside of the garment at selected locations, so that when a patient wears the garment, the electrically conductive cloth of the various electrodes are applied against selected portions of the body. Due to the elastic qualities of the garment material, the electrodes are securely held in position and in good electrical contact with the patient's skin, without the need for the usually applied conductive jelly or paste.

Each electrode is connected to a very flexible wire by a special riveting arrangement, designed to insure proper and uniform contact between the electrically conductive cloth and the wire, with a minimum of potential loss therebetween. Each wire terminates at a multipin miniature connector fastened to the garment at the front thereof. The wires are routed in the garment from the electrodes to the connector in a manner so that even when the patient performs the most strenuous exercises, the wires are subjected to a minimum of strain. The connector is of the type which may be connected to a mating part, extending from a standard vectorcardiogram recording device.

Generally, by simply donning the garment without preparing the skin with paste or jelly, the electrodes are in proper positions and in sufficient contact with the skin. Since the electrodes are secured between the body and the skintight garment, a patient may perform various physical exercises with little danger of loss of electrical contact between the body and any of the electrodes or changes in the positions of the electrodes. After donning the garment, the connector is coupled to a recording device, and signals induced in the electrodes are supplied thereto to produce the desired graph.

The specially designed electrodes are relatively large, resulting in signals with a high signal-to-noise ratio. Such signals produce a graph which can be interpreted by people with much less experience than has been required heretofore. In addition, due to the high signal-to-noise ratio resulting by using this invention, the signals may be automatically processed.

The novel features that are considered characteristic of this invention are set forth with particularly in the appended claims.

The invention will best be understood from the following description when read in connection with the accompanying drawings.

DESCRIPTION OF THE PREFERRED EMBODIMENTS

Figure 1:
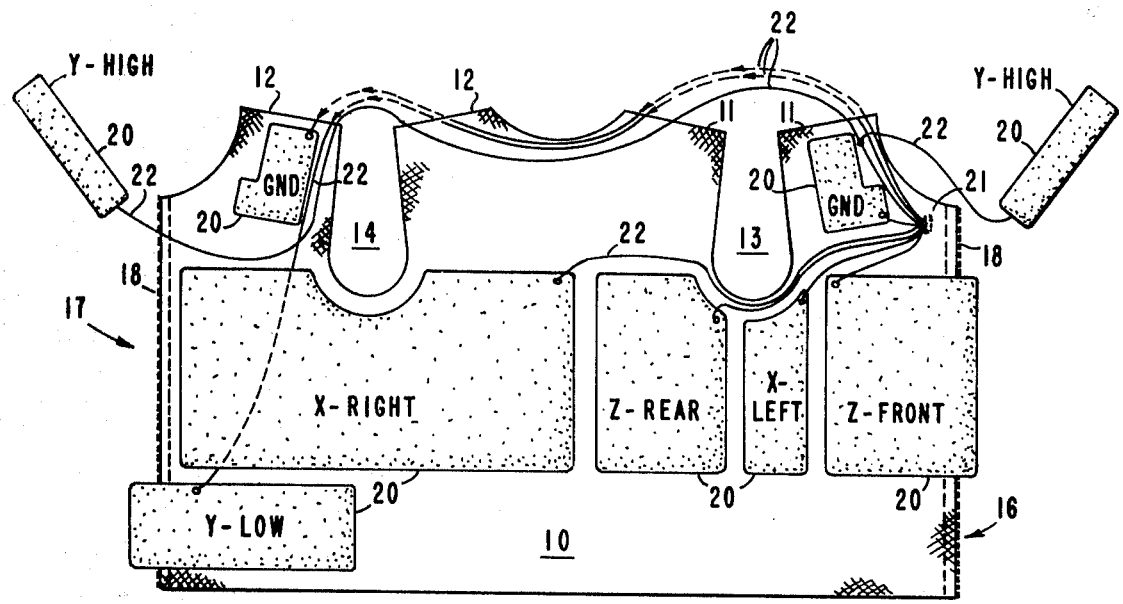
FIG. 1 is a view of the interior of a garment of one embodiment of the invention.

Referring to FIG. 1, there is shown a view of the interior of one embodiment of the invention, which includes a vest 10. The vest is made of an elastic electrically nonconductive material. In FIG. 1, lines 11 and 12 represent seams which, in practice, are joined to define arm openings 13 and 14. Open ends 16 and 17 of the vest may be fastened together by a zipper 18.

Vests of different sizes may be required to fit differently sized patients. The only requirement is that the vest be substantially skintight when worn for obtaining the signals required for making a vectorcardiogram.

Figure 2:
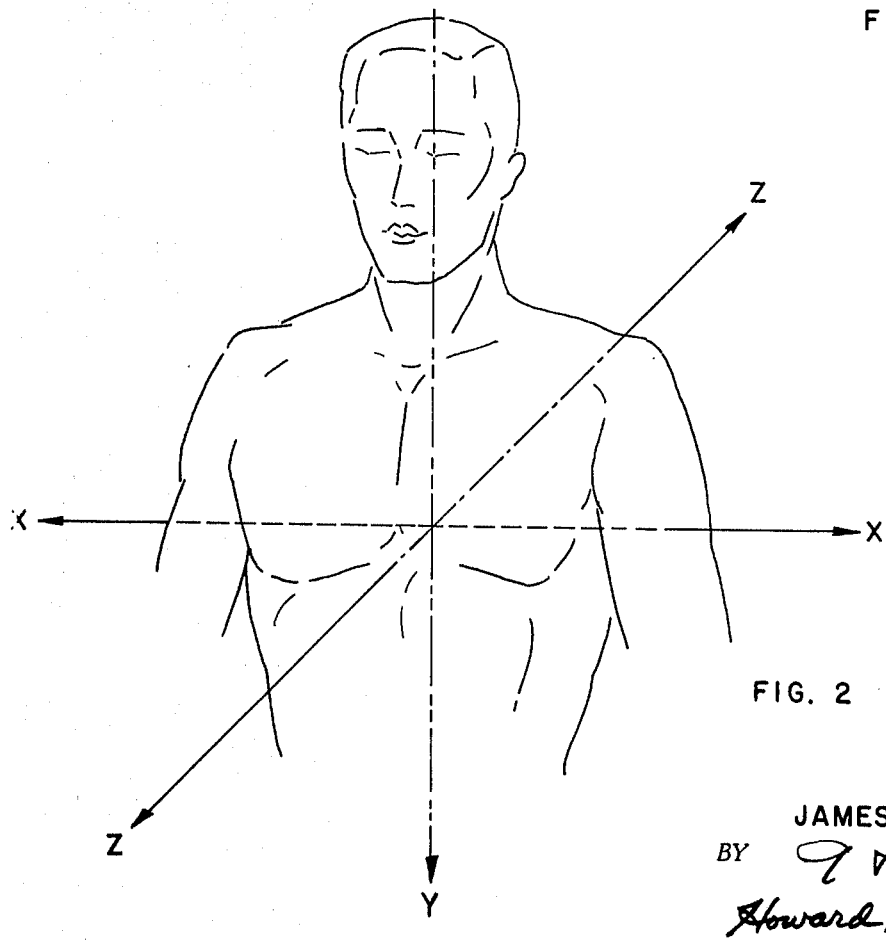
FIG. 2 illustrates the convention of vectorcardiography axes with respect to a human body.

A plurality of specially designed electrodes are secured to the vest inner surface. These electrodes are generally designated in FIG. 1 by the numeral 20, which is associated with specific designations which are related to conventional axes of vectorcardiography with respect to the chest of a human body. These axes are diagrammed in FIG. 2 to which reference is made herein. They are designated by double-headed arrows X, Y and Z which intersect at the center of the chest.

Figure 3:
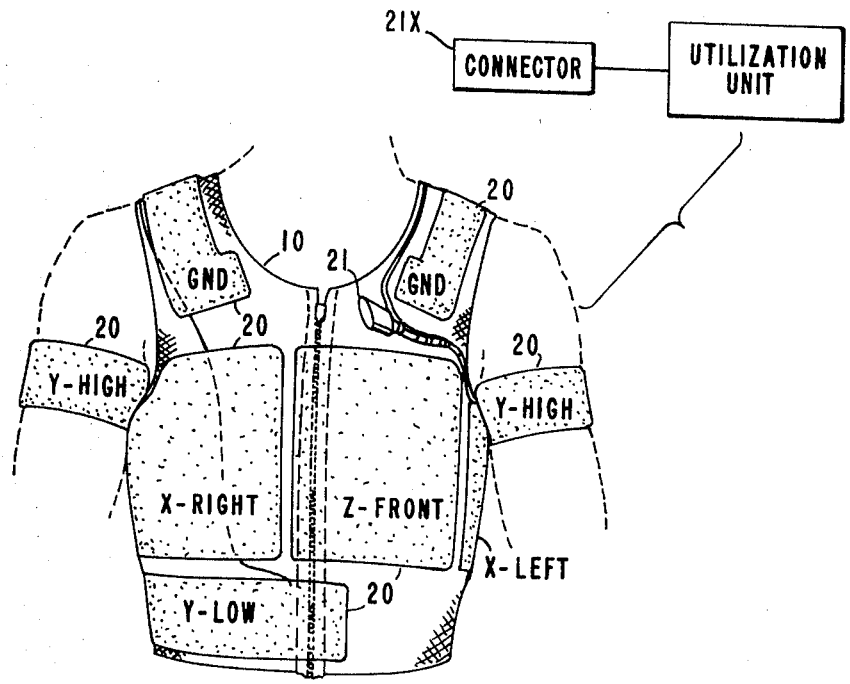
FIGS. 3 and 4 illustrate front and back views respectively, of the garment shown in FIG. 1 as worn by a user.
Figure 4:
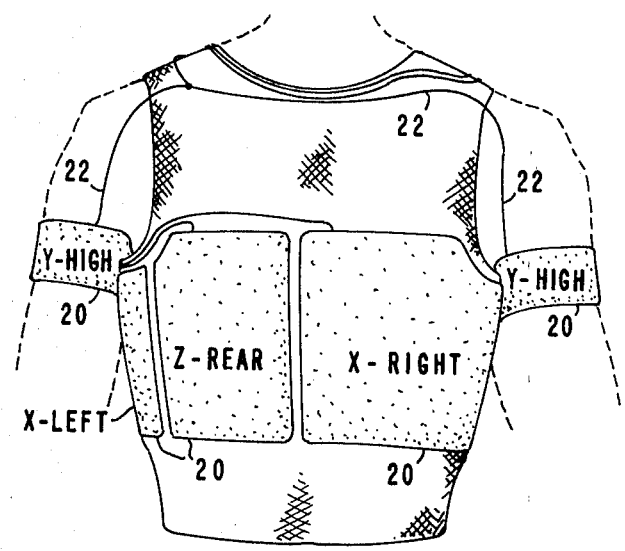

Front and back views of the vest 10 as worn by a patient are illustrated in FIGS. 3 and 4, respectively. There, the shaded areas represent the electrodes which are secured in their respective positions between the patient's skin and the skintight vest.

In the specific embodiment diagrammed in FIGS. 1, 3, and 4, the X-RIGHT electrode covers the right side of the upper part of the body from about the center of the chest and around the right side to the center of the back, while electrode X-LEFT covers only the body portion under the left arm. Electrodes Z-FRONT and Z-REAR cover the left side of the chest and back, respectively, while electrode Y-LOW covers the front right side of the waistline. Two GROUND electrodes cover the front parts of the body just below the shoulders, while two Y-HIGH electrodes which are not supported by the vest but are connected thereto, are used to cover the upper arms above the arm biceps. The Y-HIGH electrodes, unlike the other electrodes, may be fastened in position by any convenient electrically nonconductive material after the vest is donned by a patient.

As may be seen from FIGS. 1, 3, and 4, each electrode is connected to a common connector 21 (FIG. 3) by a separate flexible wire or lead 22. The connector which, as seen in FIG. 3, is fastened to the front of the vest 10 near the neck opening, is preferably a miniature multipin connector. It is of the type which couples to a mating connector 21X (FIG. 3) to which leads from a recording device are permanently electrically connected. In FIG. 3, the recording device is generally designated as a utilization unit. Thus, after donning the vest and fastening electrodes Y-HIGH to the arms, by coupling the two mating connectors, the electrodes are electrically connected to the recording device.

The wires 22 are preferably of very flexible stranded copper coated with soft electrically insulating plastic material. Even though the wires are very flexible, it is desirable to route them to the connector 21 in such a manner that minimum strain is placed on any given wire even when the patient performs most strenuous exercises. The wires 22 may be routed along the inner surface of the vest or along the exterior thereof. The only basic routing requirement is that a wire from one electrode not be routed between the body and the conductive layer of another electrode in order not to interfere with the conductive path therebetween.

Unlike prior art electrodes which are small and rigid, the electrodes included in the present invention are relatively large, capable of providing large signals which account for the high signal-to-noise ratio, realizable with the present invention. Each electrode, despite its relatively large size, is capable of conforming to the portion of the body with which it is to be in contact by virtue of its flexibility which is achieved by constructing the electrode with flexible or elastic material.

Figure 5:
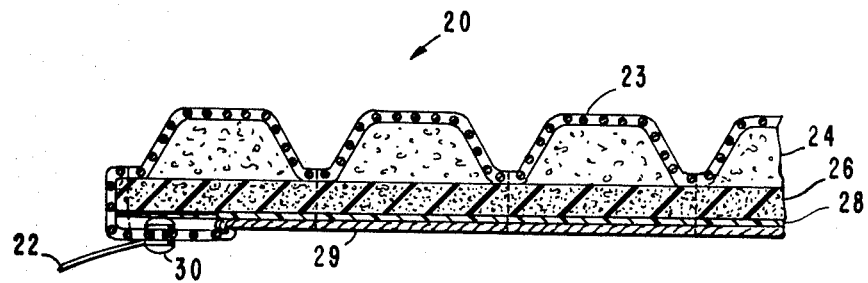
FIG. 5 is a cross-sectional view of one embodiment of a flexible electrode constructed in accordance with the teachings of the present invention.

This aspect of the invention may best be explained in conjunction with FIG. 5 which is a partial cross-sectional view of one of the electrodes, characteristic of all others. Basically, each electrode 20 includes a layer of flexible conductive material 23 which adheres to a layer of elastic material 24. Material 24 is in turn backed by a layer of soft conformal matter, such as foam rubber 26. It is the conductive layer 23 which comes in contact with the patient's body. And since the layer 23 and materials 24 and 26 are soft and flexible, the conductive layer easily conforms to the patient's body as the electrode is pressed against it by the skintight vest 10.

If desired, the foam rubber layer 26 may be attached to a firm support of semirigid material 28 which has been generally shaped to match the particular area of the body to which the particular electrode is to conform. In a preferred embodiment of the electrode, the conductive material 23 is silvered nylon cloth which, when pressed against the body, requires no additional preparation for use as a conductive surface. It may be placed in intimate contact with the body for prolonged periods with little or no discomfort or irritation. The semirigid material 28 may be polyethylene or any other similar matter which can be shaped to match a particular area of the body. A cover material 29, such as white cotton, may serve as a cover for the opposite side of the semirigid material 28 as well as be sewn to the ends of the conductive layer 23.

Figure 6:
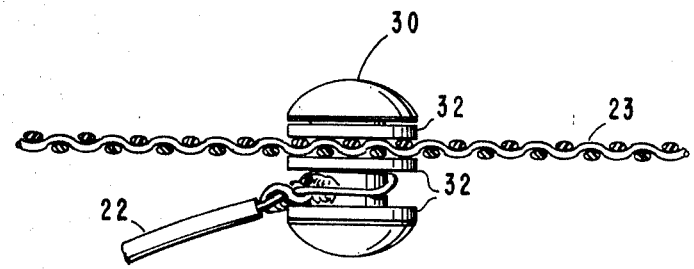
FIG. 6 is a side view of electrical coupling arrangement incorporated in the electrodes of the present invention.

To insure proper electrical coupling between the conductive layer 23 and the wire 22, as well as minimize any potential differences therebetween, each wire is preferably attached to its respective electrode by an arrangement which may best be described in conjunction with FIG. 6, to which reference is made herein. Briefly, the arrangement includes a metallic rivet 30 to which the conductive layer 23 is securely fastened between conductive washers 32, forming part of the rivet. The wire 22 of each respective electrode is conductively connected to the rivet such as by soldering. When the conductive layer 23 includes threads of a nonoxidizable metal, such as silver as the conductive elements, it is preferable to fabricate the rivet 30 and washers 32 of the same metal to avoid the use of dissimilar metals in proximity with the patient's skin.

In use, the patient or subject simply dons the vest 10 without preparing his skin in any special way. After closing the vest with zipper 18 (FIG. 1), the electrodes are checked for proper seating against the body. To facilitate the proper positioning of the electrodes, it may be desirable to fasten the electrodes to the inside of the vest with patches of adhesive material which does not irritate the skin, such as Velcro material. This allows the electrodes to be repositioned for each individual to obtain best contact with the skin which results in the best signal output. Thereafter, connector 21 which represents the signal output terminal of the vest may be attached to any standard electrocardiogram recording device. For the particular electrode arrangement shown in FIGS. 1, 3, and 4, the connector may be coupled to a device having three channels of differential inputs. The vest may also be connected, through a differential amplifier, to any standard oscilloscope or to a multichannel electrocardiographic oscilloscope.

When in use, the vest does not require any special attention. It may be work for extended periods of time without special care. It should be noted that although the vest can be used even during extreme exercise testing without preparing the patient's skin with jelly or paste to provide signals with a high signal-to-noise ratio, under extreme conditions of violent motion, some dampening of the conductive cloth 23 of the electrodes may be desirable. This may be accomplished by dampening the electrodes prior to donning the vest rather than apply it over large parts of the patient's skin.

In some applications in which the patient may be required to perform highly active exercises, it may be desirable to replace the large area electrodes 20 with electrodes which consist of flexible tubings. In such an arrangement, each electrode may include a plurality of small highly flexible tubings. The tubings have a conductive coating which is in contact with the patient's skin when the vest is used. The tubings which can be subjected to considerable stretching without tearing are conductively interconnected so that the electrode remains in contact with the body even under extreme bending motion.

Until now this invention has been described in connection with a skintight type vest, referred to as being used by a patient. It should, however, be appreciated that the teachings are similarly applicable to other types of outer garments which, when donned, are tight against the wearer's skin and that such garments may be worn by any user whose vectorcardiogram is to be recorded.

Figure 7:
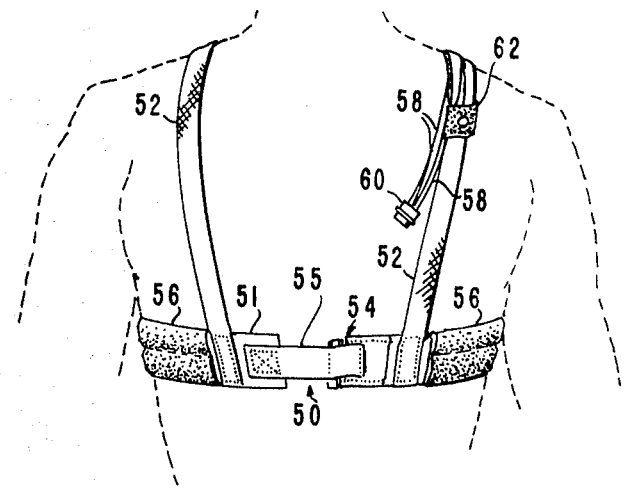
FIGS. 7 and 8 illustrate front and back views respectively, of another embodiment of the invention as worn by a user.
Figure 8:
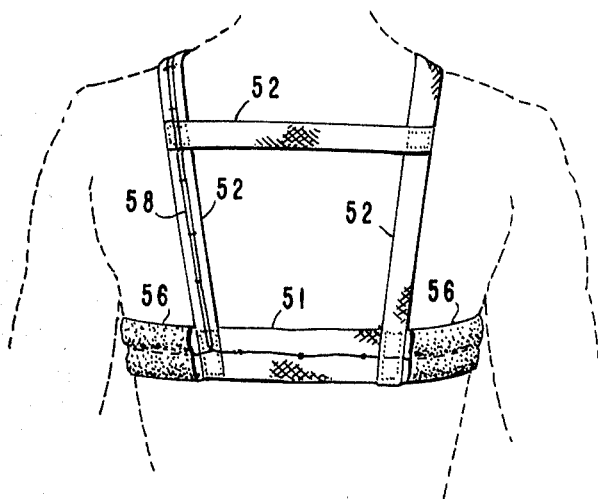

Reference is now made to FIGS. 7 and 8 which are front and back views, respectively, of a garment 50 as worn by a user. The garment 50 actually consists of a chest belt 51, designed to provide one channel of electrocardiogram data with a minimum of instrumentation. Belt 51 is securely held in place about the user's chest by a plurality of straps 52. The belt and straps are preferably made of an elastic material such as cotton twill tape which may be in contact with the body for prolonged periods without causing skin irritation. Skintight fit of the belt is provided by the flexibility of the belt and a fastener 54 which is preferably located at the front of the belt.

To accommodate a range of user sizes, the belt may incorporate a strip 55 of elastic tape which, in addition to maintaining the belt tightly against the chest, also permits ease of movement and no restriction on breathing. Belt 51 supports a plurality of tubelike electrodes 56 which, unlike the electrodes 20 previously described, consist of only a conductive layer of cloth and a foam rubber backing both of which may be directly sewn to belt 51. The electrodes 56 may be interconnected to obtain a large area response.

The interconnected electrodes are in turn connected by a wire 58 (FIG. 8) to a connector 60 (FIG. 7) which is similar to connector 21, herebefore described. A reference or ground electrode 62 is sewn to one of the straps 52 so that when the garment 50 is worn, electrode 62 is in contact with the front portion of the body about and below one of the shoulders, for example, the left shoulder. Electrode 62 is similarly connected by its respective wire 58 to connector 60, so that when the garment is worn, signals from electrodes 56 and 62 are received at the connector to be transferred to a recording device, couplable to the connector.

The simplicity and ease of construction of garment 50 permits it to be made in many different sizes to accommodate different sizes of users. Its light weight and simplicity allows it to be donned by the user himself and it can be worn continuously for prolonged periods without impeding normal physical activity.

There has accordingly been shown and described herein a novel arrangement comprising a skintight garment, supporting a plurality of electrodes of the type used to obtain signals from the body of the garment wearer. The electrodes are flexible so that when the garment is worn, they conform to the shape of the body and are securely applied against it, maintaining electrical contact therewith even when the wearer is physically active.

It should be appreciated that those familiar with the art may make modifications and/or substitute equivalents in the arrangement as shown without departing from the spirit of the invention.

I claim:

1. An arrangement for applying electrodes to a body to derive signals therefrom, comprising:
   a garment of elastic, electrically nonconductive material including tightening means for tightening the garment against said body;
   a plurality of electrodes supported about the interior surface of said garment, each electrode including an exposed flexible electrically conductive layer in contact with a different part of said body; and
   output means coupled to said electrodes to receive signals therefrom.

2. The arrangement as recited in claim 1 wherein the conductive layer of each electrode comprises a flexible electrically conductive layer of cloth, and each electrode further includes an elastic support layer for supporting the conductive layer of cloth to said garment at a selected location thereat, whereby said conductive layer of cloth and said elastic support layer conform to the shape of said body when the garment is worn with the conductive layer of cloth in electrical contact with the body.

3. The arrangement as recited in claim 2 wherein said output means includes a multiterminal connector connected at a preselected location on the exterior of said garment, and a separate insulated electrically conductive wire electrically coupled at one end to said flexible electrically conductive layer of cloth and at the other end to one of the terminals of said connector.

4. The arrangement as recited in claim 3 wherein said garment comprises a vest supporting said electrodes at selected locations about the interior thereof, said vest defining neck and arm openings, the tightening means being adapted to tightly close said vest about the upper part of the user's body, with said openings adapted to receive the user's neck and arms.

5. An arrangement for applying electrodes to a body to derive signals therefrom, comprising:
   a garment of elastic, electrically nonconductive material including tightening means for tightening the garment against said body;
   a plurality of electrodes supported about the interior surface of said garment, each electrode including an exposed flexible electrically conductive layer in contact with a different part of said body;
   output means coupled to said electrodes to receive signals therefrom;
   said conductive layer of each electrode comprises a flexible electrically conductive layer of cloth, and each electrode further includes an elastic support layer for supporting the conductive layer of cloth to said garment at a selected location thereat, whereby said conductive layer of cloth and said elastic support layer conform to the shape of said body when the garment is worn with the conductive layer of cloth in electrical contact with the body;
   said output means includes a multiterminal connector connected at a preselected location on the exterior of said garment, and a separate insulated electrically conductive wire electrically coupled at one end to said flexible electrically conductive layer of cloth and at the other end to one of the terminals of said connector;
   said garment comprises a vest supporting said electrodes at selected locations about the interior thereof, said vest defining neck and arm openings, the tightening means being adapted to tightly close said vest about the upper part of the user's body, with said openings, adapted to receive the user's neck and arms;
   said electrodes supported by said vest include a first electrode in contact with the body from about the center of the chest and around the right side of said body to about the center of the back;
   a second electrode in contact with the body under the left arm;
   a third electrode in contact with the left portion of the chest;
   a fourth electrode in contact with the left side of the back; and,
   at least one ground electrode in contact with the front part of the body below one of the shoulders.

6. The arrangement as recited in claim 5 wherein the vest further supports a fifth electrode in contact with the right side of the front waistline and a second ground electrode in contact with the front part of the body below the other shoulder, said arrangement further including a pair of arm electrodes, each arm electrode being in electrical contact with a selected part of one of the user's arms to provide signals therefrom to said connector.

7. The arrangement as recited in claim 6 wherein said electrically conductive layer of cloth includes strands of a nonoxidizable metal and each electrode further includes metallic means fabricated of said nonoxidizable metal for electrically connecting the conductive layer of cloth of each electrode to the wire of said electrode.

8. The arrangement as recited in claim 7 wherein each electrode further includes a layer of semirigid material for supporting the elastic support layer and the electrically conductive layer of cloth, the layer of semirigid material of each electrode being shaped to conform generally to the shape of the part of the body with which its respective electrode is to come in electrical contact.

9. The arrangement as recited in claim 7 wherein said nonoxidizable metal is silver.

10. The arrangement as recited in claim 9 wherein each electrode further includes a layer of semirigid material for supporting the elastic support layer and the electrically conductive layer of cloth, the layer of semirigid material of each electrode being shaped to conform generally to the shape of the part of the body with which its respective electrode is to come in electrical contact.

11. Apparatus for deriving electrical signals from a body comprising:
a plurality of flexible conductive electrodes each of which is shaped to conform substantially to a different region of a body;
elastic means for simultaneously holding said plurality of electrodes in contact with the different regions of said body;
means for utilizing the signals from said body obtained by said plurality of electrodes; and
connector means for connecting said plurality of electrodes to said means for utilizing said signals.

12. The apparatus as recited in claim 11 wherein said means for simultaneously holding comprise a garment including:
means for tightening said garment about a selected part of said body; and
means for supporting said electrodes to the interior of said garment, whereby said electrodes are held in contact with said body when said garment is tightened about said body.

13. The apparatus as recited in claim 12 wherein each electrode includes a flexible layer of electrically conductive cloth held against said body in electrical contact therewith.

14. The apparatus as recited in claim 13 wherein said electrically conductive layer of cloth includes strands of a nonoxidizable metal.

15. The apparatus as recited in claim 13 wherein said garment is a vest supporting a plurality of electrodes about the interior thereof.

16. An electrode for receiving signals from a selected region of a body with which it is in contact comprising:
a layer of flexible electrically conductive cloth;
a first layer of elastic material to which said layer of conductive cloth is permanently secured;
first means to which said layer of conductive cloth is permanently connected through said first layer of elastic material for applying and securing said conductive cloth against said body;
electrically conductive means;
second means permanently connected to said conductive cloth and said electrically conductive means for electrically connecting said electrically conductive means to said conductive cloth to receive signals therefrom; and
a layer of semirigid material disposed between said first layer of elastic material and said first means for fastening said first layer of elastic material to said first means, said layer of semirigid material being fixedly shaped to conform generally to the shape of the region of the body with which the electrode is to come in contact.